United States Patent
Kim (10) Patent No.: US 11,861,111 B2
(45) Date of Patent: Jan. 2, 2024

(54) TOUCH SENSING DISPLAY DEVICE AND DRIVING METHOD THEREOF

(71) Applicant: LG Display Co., Ltd., Seoul (KR)

(72) Inventor: Kil Tae Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/959,118

(22) Filed: Oct. 3, 2022

(65) Prior Publication Data

US 2023/0214059 A1 Jul. 6, 2023

(30) Foreign Application Priority Data

Dec. 31, 2021 (KR) .......................... 10-2021-0194603

(51) Int. Cl.
*G06F 3/041* (2006.01)

(52) U.S. Cl.
CPC ...... *G06F 3/04184* (2019.05); *G06F 3/04182* (2019.05); *G06F 2203/04106* (2013.01)

(58) Field of Classification Search
CPC ............. G06F 3/04184; G06F 3/04182; G06F 2203/04106
See application file for complete search history.

(56) References Cited

U.S. PATENT DOCUMENTS

| | | | |
|---|---|---|---|
| 2010/0110040 A1* | 5/2010 | Kim ..................... | G06F 1/3215 345/174 |
| 2018/0046297 A1* | 2/2018 | Weng ................... | G06F 3/04166 |
| 2018/0136778 A1* | 5/2018 | Choi ...................... | G06F 3/044 |
| 2019/0034027 A1* | 1/2019 | Bohannon ............. | G06F 3/0418 |
| 2021/0397327 A1* | 12/2021 | Lee ..................... | G06F 3/04182 |
| 2022/0276760 A1* | 9/2022 | Lee ..................... | G06F 3/04184 |

\* cited by examiner

*Primary Examiner* — Bryan Earles
(74) *Attorney, Agent, or Firm* — Birch, Stewart, Kolasch & Birch, LLP (57) ABSTRACT

A touch sensing display device and a driving method thereof for improving touch noise characteristics during moving image driving are discussed. The touch sensing display device can include a display panel including touch electrodes and subpixels defined by data lines and gate lines, and a timing controller configured to output an average data value and a touch synchronization signal in which display driving periods and touch driving periods are alternately time-divided, a touch controller configured to output a charge remover capacitance compensation value, a charge remover voltage compensation value, and a gain compensation value according to the average data value. Further, the touch sensing display device can include a power controller configured to output a charge remover voltage according to the charge remover voltage compensation value, and a touch driving circuit configured to sense a touch signal from each touch electrode and output a touch sensing value.

11 Claims, 7 Drawing Sheets

| Average Data | CRC | CRV | Gain |
|---|---|---|---|
| 0 | . | . | . |
| ⋮ | ⋮ | ⋮ | ⋮ |
| 125 | . | . | . |
| ⋮ | ⋮ | ⋮ | ⋮ |
| 255 | . | . | . |

TOUCH SENSING DISPLAY DEVICE AND DRIVING METHOD THEREOF

CROSS-REFERENCE TO RELATED APPLICATIONS

This application claims priority to Korean Patent Application No. 10-2021-0194603, filed in the Republic of Korea on Dec. 31, 2021, the entire contents of which are hereby expressly incorporated by reference into the present application.

BACKGROUND OF THE INVENTION

Field of the Invention

The present invention relates to a touch sensing display device and a driving method thereof.

Discussion of the Related Art

With development of multimedia, the importance of a flat panel display has been increasing. In response thereto, flat panel displays such as a liquid crystal display (LCD) and an organic light emitting display (OLED) have been commercialized.

These flat panel displays are widely used as portable display devices due to advantages such as excellent image quality, light weight, thinness, and low power consumption, and are particularly widely applied to notebook computers, computer monitors, televisions, etc.

There has been a widely used touch sensing display device in which a touch panel is stacked on such a flat panel display to detect a touch point where a hand or a stylus pen comes into contact and output information corresponding to the touch point or perform calculation when electrical characteristics such as resistance or capacitance change at the touch point. Such a touch sensing display device is a user interface, and an application range thereof has been expanding to small portable terminals, office equipment, mobile devices, etc.

However, when a separate touch panel is stacked on the display device, the thickness of the touch sensing display device can increase, and thus there can be disadvantages in that there is a limit to manufacturing a thin display device, transmission efficiency of light decreases while passing through the stacked touch panel, and production costs increase. In order to address such an issue, an advanced in-cell touch (AIT) type touch sensing display device, in which a touch sensor is embedded in a pixel region of the display device, has been proposed.

In a touch sensing display device in which a touch sensor is embedded in a pixel area, touch sensors can be mounted on a display panel without increasing the thickness of the display panel. In order to reduce a mutual influence due to coupling between a pixel and a touch sensor, such a touch sensing display device uses a method of temporally dividing a display driving period for driving the pixel and a touch driving period for driving the touch sensor.

In this instance, a touch sensing signal is integrated through an amplification circuit to improve touch sensitivity of the display panel and remove noise for touch sensing, and a charge remover circuit that removes a charging voltage of the amplification circuit is used together in order to prevent a sensing signal of the amplification circuit from being saturated.

However, noise characteristics can be larger when displaying a moving image than when displaying a still image, and when a window is moved while driving the moving image in a small window, the window may not move due to noise in some cases.

SUMMARY OF THE INVENTION

Accordingly, the present invention is directed to a touch sensing display device and a driving method thereof that substantially obviate one or more problems due to limitations and disadvantages of the related art.

An object of the present invention is to provide a touch sensing display device and a driving method thereof that improve touch noise characteristics when a moving image is driven.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a touch sensing display device includes a display panel including a plurality of touch electrodes and a plurality of subpixels defined by a plurality of data lines and a plurality of gate lines, a timing controller configured to output an average data value and a touch synchronization signal in which a plurality of display driving periods and a plurality of touch driving periods are alternately time-divided, a touch controller configured to output a charge remover capacitance compensation value, a charge remover voltage compensation value, and a gain compensation value according to the average data value, a power controller configured to output a charge remover voltage according to the charge remover voltage compensation value, and a touch driving circuit configured to sense a touch signal from each touch electrode and output a touch sensing value, according to the charge remover voltage, the charge remover capacitance compensation value and the gain compensation value.

In another aspect of the present invention, a driving method of a touch sensing display device includes storing charge remover capacitance compensation values, charge remover voltage compensation values, and gain compensation values according to average data values in a lookup table, outputting a touch synchronization signal and an average data value in which a plurality of display driving periods and a plurality of touch driving periods are alternately time-divided, outputting a charge remover capacitance compensation value, a charge remover voltage compensation value, and a gain compensation value according to an average data value, outputting a charge remover voltage according to the charge remover voltage compensation value, varying a capacitance of a charge remover capacitor according to the charge remover capacitance compensation value, varying a capacitance of a feedback capacitor according to the gain compensation value, and amplifying a touch signal from each touch electrode according to the charge remover voltage, the varied capacitance of the charge remover capacitor and the varied capacitance of a feedback capacitor, and outputting a touch sensing value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

The advantages and features of the present invention, and the method for achieving the advantages and features will become apparent with reference to embodiments described below in detail in conjunction with the accompanying drawings. However, the present invention is not limited to the embodiments disclosed below and can be implemented in a variety of different forms, and these embodiments allow the disclosure of the present invention to be complete and are merely provided to fully inform those of ordinary skill in the art to which the present invention belongs of the scope of the invention. Further, the invention is merely defined by the scope of the claims.

The shapes, sizes, proportions, angles, numbers, etc. disclosed in the drawings for describing the embodiments of the present invention are illustrative, and thus the present invention is not limited to the illustrated elements. The same reference symbol refers to the same element throughout the specification. In addition, in describing the present invention, when it is determined that a detailed description of a related known technology can unnecessarily obscure the subject matter of the present invention, such a detailed description will be omitted.

When "equipped with", "including", "having", "consisting", etc. are used in this specification, other parts can also be present, unless "only" is used. When an element is expressed in the singular, the element can be interpreted as being plural unless otherwise explicitly stated.

In interpreting an element in the embodiments of the present invention, it is to be interpreted as including an error range even when there is no separate explicit description thereof.

In addition, in describing elements of the present invention, terms such as first, second, A, B, (a), (b), etc. can be used. These terms are only for distinguishing the elements from other elements, and the nature, turn, order, number of the elements, etc. are not limited by the terms. When an element is described as being "linked", "coupled", or "connected" to another element, the element can be directly linked or connected to the other element. However, it should be understood that another element can be "interposed" between the respective elements, or each element can be "linked", "coupled", or "connected" through another element. In the case of a description of a positional relationship, for example, when a positional relationship between two parts is described using "on", "above", "below", "next to", etc., one or more other parts can be located between the two parts, unless "immediately" or "directly" is used.

Elements in the embodiments of the present invention are not limited by these terms. These terms are merely used to distinguish one element from another element. Accordingly, a first element mentioned below can be a second element within the spirit of the present invention.

Features (configurations) in the embodiments of the present invention can be partially or wholly combined or associated with each other, or separated from each other, and various types of interlocking and driving are technically possible. The respective embodiments can be implemented independently of each other, or can be implemented together in an interrelated relationship.

Hereinafter, the embodiments of the present invention will be described in detail with reference to the accompanying drawings. All the components of each display device according to all embodiments of the present invention are operatively coupled and configured.

Figure 1:
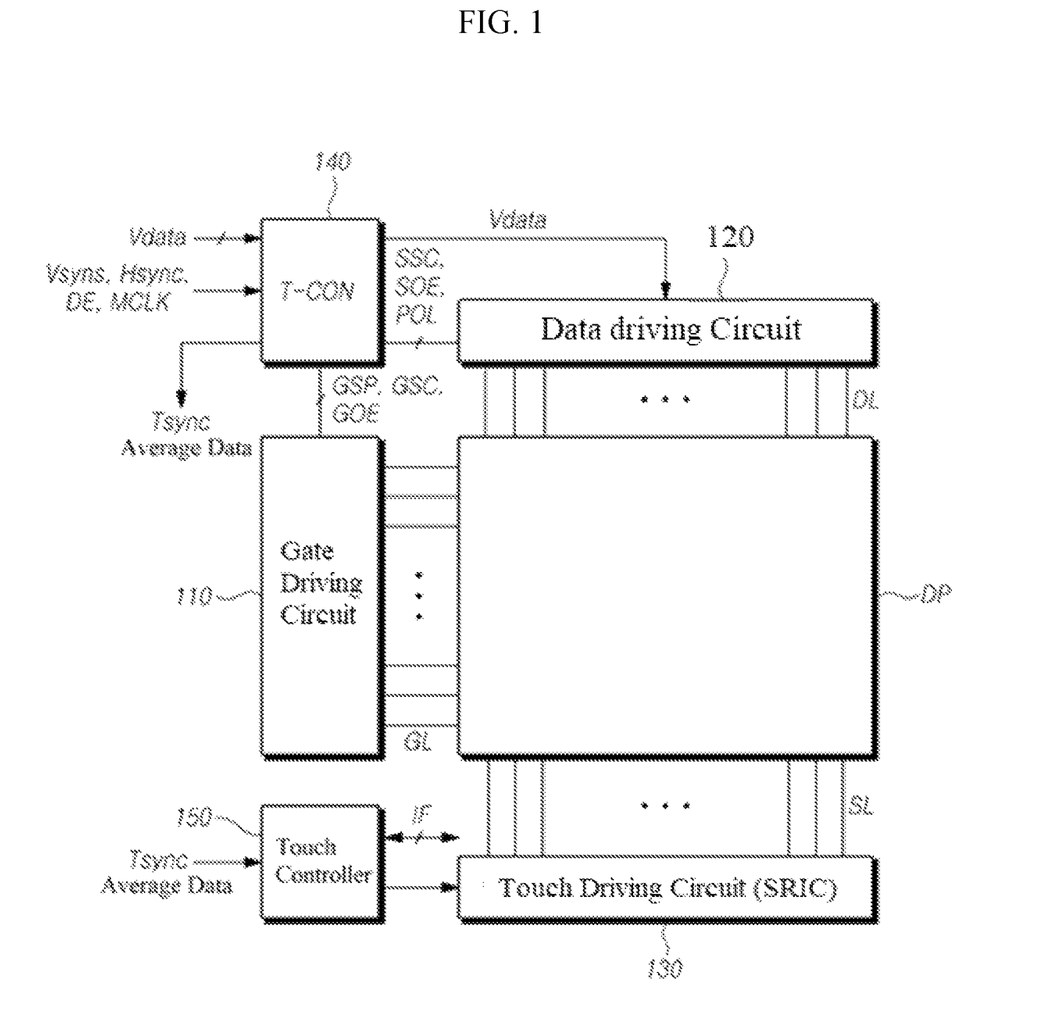
FIG. 1 is a configuration block diagram of a touch sensing display device according to an embodiment of the present invention.

FIG. 1 is a configuration block diagram illustrating a touch sensing display device according to an embodiment of the present invention.

As illustrated in FIG. 1, the touch sensing display device according to the embodiment of the present invention can include a display panel DP, a gate driving circuit 110, a data driving circuit 120, a touch driving circuit SRIC 130, a timing controller T-CON 140, and a touch controller 150.

The display panel DP displays an image based on a scan signal SCAN delivered from the gate driving circuit 110 through a gate line GL and a data signal Vdata delivered from the data driving circuit 120 through a data line DL.

The display panel DP includes a plurality of subpixels SP defined by a plurality of data lines DL and a plurality of gate lines GL.

When the display panel DP is a liquid crystal display panel, one subpixel SP can include a thin film transistor (TFT) for supplying a data voltage Vdata of the data line DL to a pixel electrode according to a scan signal of the gate line GL, and a storage capacitor Cst charging the data voltage Vdata and maintaining the data voltage Vdata for one frame.

When the display panel DP is an organic light emitting display panel, one subpixel SP can include an organic light emitting diode (OLED), a switching transistor for supplying a data voltage of the data line DL, a driving transistor for controlling current flowing through the OLED according to a data voltage supplied by the switching transistor, and a capacitor Cst charging the data voltage Vdata and maintaining the data voltage Vdata for one frame.

Meanwhile, the display panel DP can include a touch panel embedded in a pixel array using an in-cell self-touch scheme. The touch panel includes a touch sensor (electrode). A detailed description of the touch panel will be described later.

The timing controller 140 controls the gate driving circuit 110 and the data driving circuit 120. The timing controller 140 is supplied with image data Vdata and timing signals such as a vertical synchronization signal Vsync, a horizontal synchronization signal Hsync, a data enable signal DE, and a main clock MCLK from a host system (not illustrated).

The timing controller 140 controls the gate driving circuit 110 based on scan timing control signals, such as a gate start pulse GSP, a gate shift clock, and a gate output enable signal GOE. In addition, the timing controller 140 controls the data driving circuit 120 based on data timing control signals such as a source sampling clock SSC, a polarity control signal POL, and a source output enable signal SOE.

The gate driving circuit 110 sequentially drives a plurality of gate lines GL by sequentially supplying a scan signal SCAN to the display panel DP through the plurality of gate lines GL. Here, the gate driving circuit 110 is also referred to as a scan driving circuit or a gate driving integrated circuit GDIC.

The gate driving circuit 110 sequentially supplies a scan signal SCAN of an on voltage or an off voltage to the plurality of gate lines GL under control of the timing controller 140. To this end, the gate driving circuit 110 can include a shift register, a level shifter, etc.

The gate driving circuit 110 can be located only on one side (for example, left side or right side) of the display panel DP, and can be located on both sides of the display panel DP according to a driving scheme, a design scheme, etc. depending on the case.

The data driving circuit 120 receives image data Vdata from the timing controller 140 and supplies an analog image data voltage corresponding to the image data to the plurality of data lines DL, thereby driving the plurality of data lines DL. Here, the data driving circuit 120 is also referred to as a source driving circuit or a source driving integrated circuit SDIC.

When a specific gate line GL is enabled by the gate driving circuit 110, the data driving circuit 120 converts the image data Vdata received from the timing controller 140 into an analog image data voltage and supplies the analog image data voltage to the plurality of data lines DL.

The data driving circuit 120 can be located only on one side (for example, upper side or lower side) of the display panel DP, and can be located on both sides of the display panel DP according to a driving scheme, a design scheme, etc.

The data driving circuit 120 can include a shift register, a latch circuit, a digital-to-analog converter DAC, an output buffer, etc. Here, the digital-to-analog converter DAC is configured to convert the image data Vdata received from the timing controller 140 into an analog image data voltage to be supplied to the data line DL.

The touch driving circuit 130 senses the presence or absence of a touch and a touched position on the display panel DP. The touch driving circuit 130 includes a driving circuit that generates a driving voltage for driving the touch sensor, and a sensing circuit that senses the touch sensor and generates data for detecting the presence or absence of a touch, coordinate information, etc. The driving circuit and the sensing circuit of the touch driving circuit 130 can take the form of one integrated circuit (IC) or can be divided and separated by function.

The touch driving circuit 130 can be formed on an external substrate connected to the display panel DP. The touch driving circuit 130 is connected to the display panel DP through a plurality of sensing lines SL. The touch driving circuit 130 can sense the presence or absence and position of a touch based on a difference in capacitance between touch sensors formed on the display panel DP. For example, a deviation in capacitance occurs between a position touched by a finger of a user and a non-contact position, and the touch driving circuit 130 senses the presence or absence and position of a touch using a scheme of detecting such a deviation in capacitance.

The touch driving circuit 130 generates a touch sensing signal for the presence or absence and position of a touch and transmits the touch sensing signal to the touch controller 150.

The touch controller 150 controls the touch driving circuit 130. The touch controller 150 receives control synchronization signals Vsync and Tsync from the timing controller 140 and controls the touch driving circuit 130 based on the received control synchronization signals Vsync and Tsync. The touch controller 150 transmits and receives a touch sensing signal based on an interface IF defined with the touch driving circuit 130.

Figure 2:
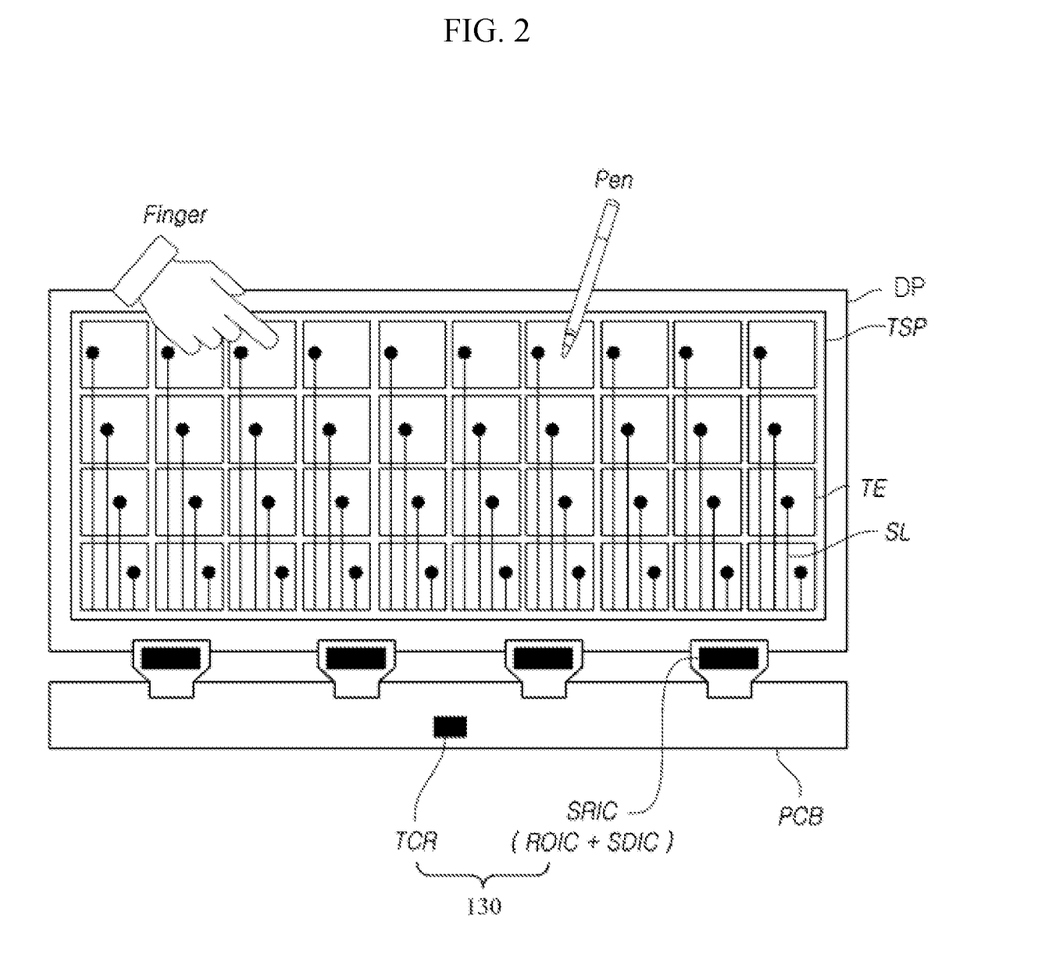
FIG. 2 is a specific configuration diagram of a touch driving circuit 130 and a touch panel TSP according to embodiments of the present invention.

FIG. 2 is a diagram illustrating the touch driving circuit 130 and a touch panel TSP for self-capacitance-based touch sensing in the touch sensing display device according to the embodiments of the present invention.

The touch sensing display device according to the embodiments of the present invention can sense a touch input by a finger and/or a pen through a capacitance-based touch sensing technique.

To this end, as illustrated in FIG. 2, a plurality of touch electrodes TE are disposed on the touch panel TSP. A touch driving signal can be applied to each of the plurality of touch electrodes TE and a touch sensing signal can be sensed therein. Each of the plurality of touch electrodes TE can be electrically connected to the touch driving circuit 130 through one signal line SL. A shape of one touch electrode TE illustrated in FIG. 2 is merely an example and can be designed in various ways.

A size of a region in which one touch electrode TE is formed can be larger than a size of an area in which one subpixel is formed. For example, a size of a region in which one touch electrode TE is formed can correspond to a size of several to tens of subpixel areas.

Meanwhile, as illustrated in FIG. 2, the touch driving circuit 130 includes one or more first circuits ROIC for supplying a touch driving signal to the touch panel TSP and detecting (receiving) a touch sensing signal from the touch panel TSP, a second circuit TCR for detecting the presence or absence and/or a position of a touch input using a result of detecting the touch sensing signal of the first circuit ROIC, etc.

The one or more first circuits ROIC included in the touch driving circuit 130 can be implemented by being integrated into one or more unified integrated circuits (touch driving circuit SRIC) together with one or more source driver integrated circuits SDIC implementing the data driving circuit 120.

Figure 3:
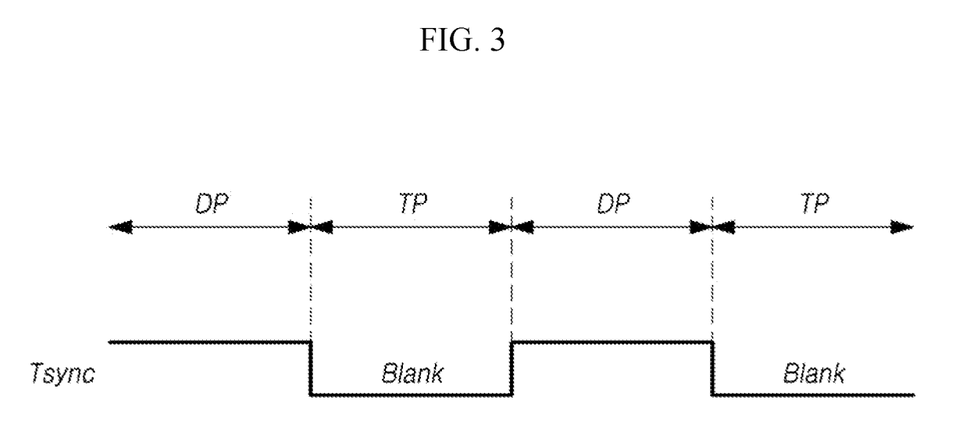
FIG. 3 is an exemplary diagram illustrating timing of display driving periods DP and touch driving periods TP of the touch sensing display device according to embodiments of the present invention.
Figure 4:
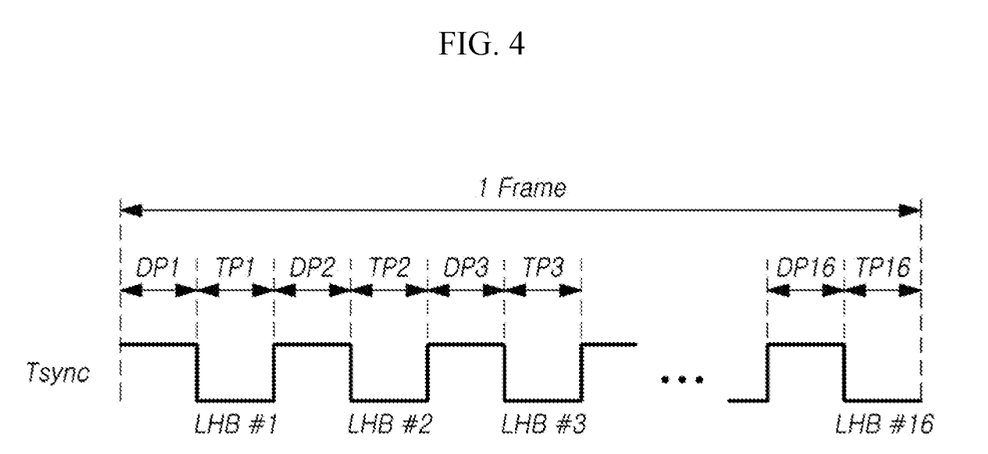
FIG. 4 is an exemplary diagram of a touch synchronization signal according to embodiments of the present invention.

FIG. 3 is an exemplary diagram illustrating timing of display driving periods DP and touch driving periods TP of the touch sensing display device according to the embodiments of the present invention, and FIG. 4 is an exemplary diagram illustrating 16 display driving periods DP1 to DP16 and 16 touch driving periods TP1 to TP16 obtained by time-dividing one frame time in the touch sensing display device according to the embodiments of the present invention.

Referring to FIG. 3, the touch sensing display device according to the embodiments of the present invention performs display driving for image display during a predetermined display driving period DP, and performs touch driving for sensing touch input by a finger and/or a pen during a predetermined touch driving period TP.

The display driving period DP and the touch driving period TP are temporally separated, and the display driving period DP and the touch driving period TP can be alternated.

As described above, when the display driving period DP and the touch driving period TP are temporally separated while being alternated, the touch driving period TP can be a blank period in which display driving is not performed.

The touch sensing display device can generate a touch synchronization signal Tsync swinging to a high level and a low level, thereby identifying or controlling the display driving period DP and the touch driving period TP.

For example, a high level section (or low level section) of the touch synchronization signal Tsync can correspond to the display driving period DP, and a low level section (or high level section) of the touch synchronization signal Tsync can correspond to the touch driving period TP.

Meanwhile, in relation to a method of allocating the display driving period DP and the touch driving period TP within one frame period, as an example, one frame period is time-divided into one display driving period DP and one touch driving period TP, so that display driving can be performed during the one display driving period DP, and touch driving for sensing touch input by a finger and/or a pen can be performed during the one touch driving period TP corresponding to a blank period.

As another example, one frame period is time-divided into two or more display driving periods DP and two or more touch driving periods TP. Display driving for one frame can be performed during two or more display driving periods DP within one frame. During two or more touch driving periods (TP) corresponding to a blank period within one frame, touch driving for sensing touch input by a finger and/or pen in the entire screen area can be performed once or twice or more, or touch driving for sensing touch input by a finger and/or a pen in a partial area of the screen can be performed.

Meanwhile, when one frame period is time-divided into two or more display driving periods DP and two or more touch driving periods TP, each of two or more blank periods corresponding to the two or more touch driving periods TP within one frame period is referred to as a "long horizontal blank (LHB)".

Here, touch driving performed during two or more LHBs within one frame is referred to as "LHB driving".

Referring to FIG. 4, one frame period can be time-divided into 16 display driving periods DP1 to DP16 and 16 touch driving periods TP1 to TP16.

In this case, the 16 touch driving periods TP1 to TP16 correspond to 16 LHBs (LHB #1 to LHB #16).

Figure 5:
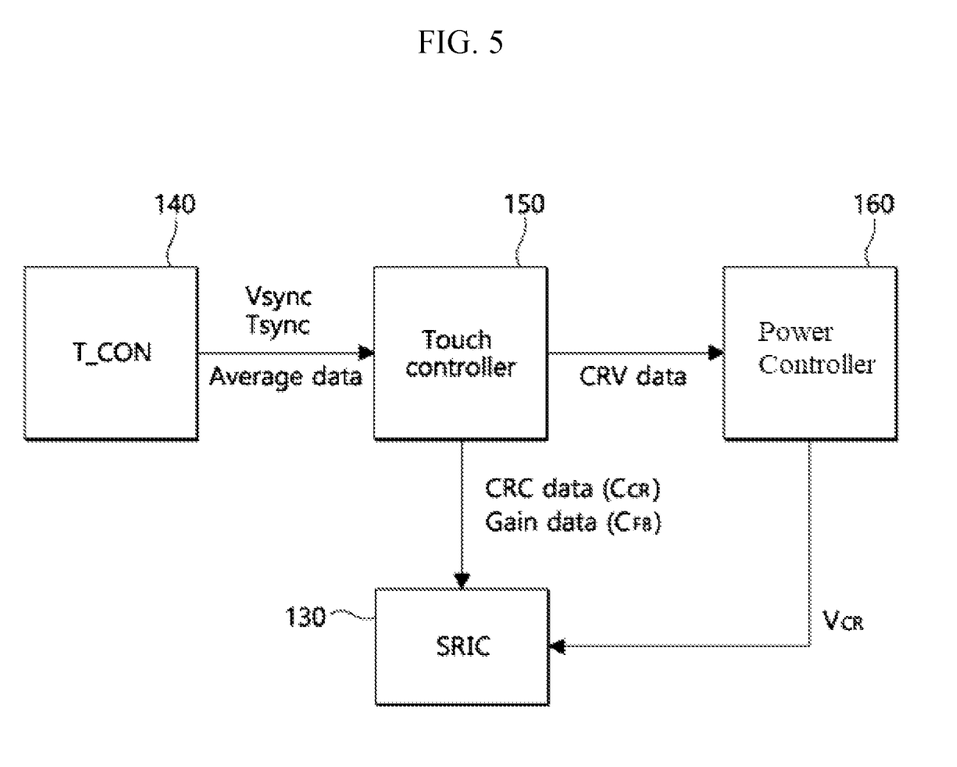
FIG. 5 is an explanatory diagram for an input/output signal of the touch driving circuit SRIC 130, a timing controller T-CON 140, and a touch controller 150 for improving touch noise characteristics during moving image driving in the touch sensing display device according to an embodiment of the present invention.
Figure 6:
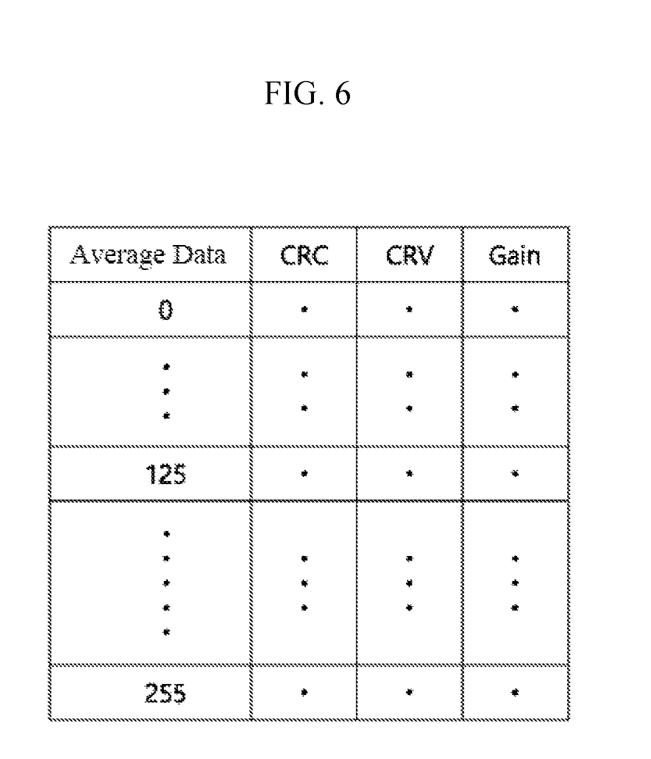
FIG. 6 is an explanatory diagram of a lookup table of the touch controller 150.

FIG. 5 is an explanatory diagram for an input/output signal of the touch driving circuit SRIC 130, the timing controller T-CON 140, and the touch controller 150 for improving touch noise characteristics when driving a moving image in the touch sensing display device according to an embodiment of the present invention. FIG. 6 is an explanatory diagram of a lookup table of the touch controller 150.

As illustrated in FIG. 5, the timing controller T-CON 140 outputs the vertical synchronization signal Vsync, the touch synchronization signal Tsync, and average data to the touch controller 150.

As described with reference to FIG. 4, the touch synchronization signal Tsync can be time-divided into 16 display driving periods DP1 to DP16 and 16 touch driving periods TP1 to TP16. The display driving period DP and the touch driving period TP alternate.

An average data value can be an average value of data supplied to the data driving circuit 120 in each of the display driving periods DP1 to DP16 before each of the touch driving periods TP1 to TP16. But the present disclosure is not limited thereto. For example, an average data value can be an average value of data supplied to the data driving circuit 120 in at least one of the display driving periods DP1 to DP16 before each of the touch driving periods TP1 to TP16

The touch controller 150 stores charge remover capacitance (CRC) compensation values, charge remover voltage (CRV) compensation values, and gain compensation values according to average data values input from the timing controller 140 in a lookup table as illustrated in FIG. 6.

When driving the moving image, and the touch electrode TE is not touched by a finger and/or a pen, a touch output voltage is relatively low when low-grayscale image data is displayed and relatively high when high-grayscale image data is displayed.

Accordingly, the charge remover capacitance (CRC) compensation values, the charge remover voltage (CRV) compensation values, and the gain compensation values stored in the lookup table are set so that a relatively high touch output voltage is output when the average data value is a low grayscale, and a relatively low touch output voltage is output when the average data value is a high grayscale.

The touch controller 150 receives an average data value from the timing controller 140 and reads a charge remover capacitance (CRC) compensation value, a charge remover voltage (CRV) compensation value, and gain compensation values according to the received average data value from the lookup table.

Then, the touch controller 150 outputs the read charge remover voltage (CRV) compensation value to the power controller 160.

The power controller 160 supplies a charge remover voltage $V_{CR}$ corresponding to the charge remover voltage (CRV) compensation value to the touch driving circuit SRIC 130.

The touch controller 150 supplies the read charge remover capacitance (CRC) compensation value and the gain compensation value to the touch driving circuit SRIC 130.

The touch driving circuit SRIC 130 senses a touch from the touch electrode according to the charge remover voltage $V_{CR}$, the charge remover capacitance (CRC) compensation value and the gain compensation value, and outputs a touch output voltage.

Figure 7:
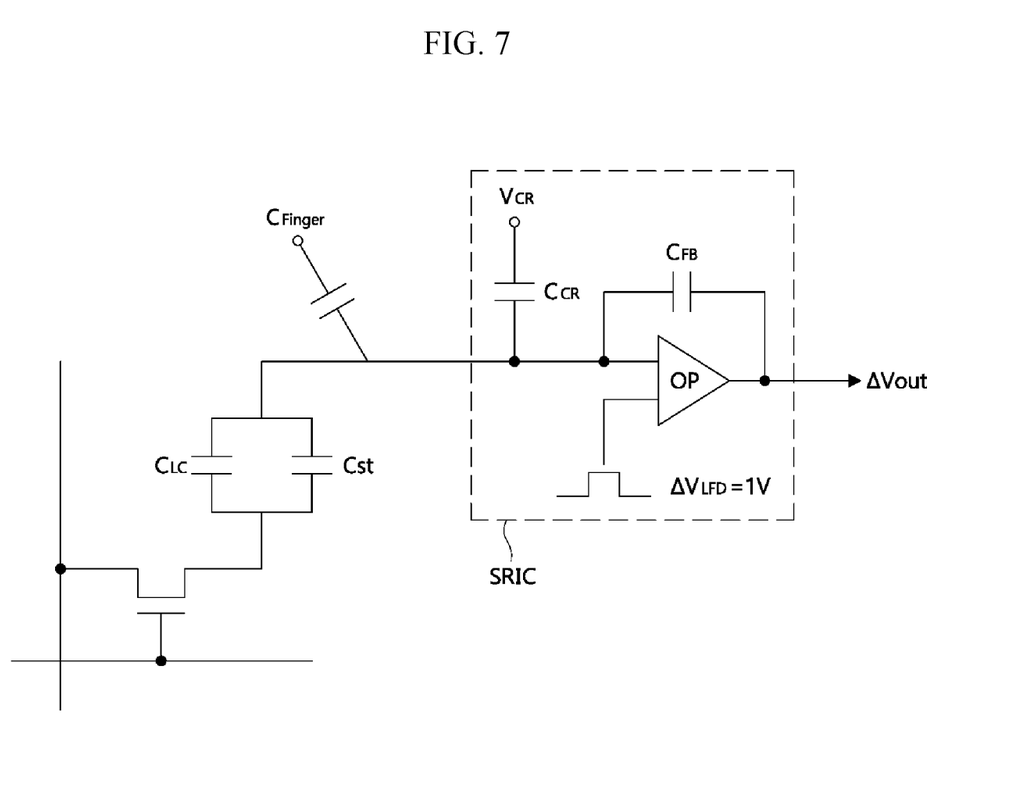
FIG. 7 is a circuit configuration diagram of the touch driving circuit SRIC in the touch sensing display device according to an embodiment of the present invention.

FIG. 7 is a circuit configuration diagram of the touch driving circuit SRIC in the touch sensing display device according to an embodiment of the present invention.

Referring to FIG. 7, the touch driving circuit SRIC integrates a touch sensing signal through an amplification circuit to improve touch sensitivity of the display panel and remove noise for touch sensing. In order to prevent a sensing signal of the amplification circuit from being saturated, a charge remover circuit that removes a charging voltage of the amplification circuit is used with the touch driving circuit SRIC. The touch driving circuit SRIC can include an OP amplifier OP, a charge remover voltage input terminal $V_{CR}$ to which the charge remover voltage $V_{CR}$ is input, a charge remover capacitor $C_{CR}$ connected between the charge remover voltage input terminal $V_{CR}$ and a first input terminal of the OP amplifier OP, and a feedback capacitor $C_{FB}$ connected between the first input terminal and an output terminal of the OP amplifier OP to adjust the amplification gain of the OP amplifier. The OP amplifier OP receives a touch signal from the touch electrode TE through the first input terminal and a reference voltage ($\Delta V_{LFD}$) through a second input terminal, amplifies the touch signal, and outputs a touch detection (sensing) voltage ($\Delta Vout$). Here, the charge remover capacitor $C_{CR}$ can be a variable capacitor. The charge remover capacitor $C_{CR}$ varies a capacitance according to a CRC compensation value output from the touch controller 150. The feedback capacitor $C_{FB}$ can be a variable capacitor. The feedback capacitor $C_{FB}$ varies a capacitance according to a gain compensation value output from the touch controller 150.

The touch driving circuit SRIC of FIG. 7 illustrates the case in which the display panel DP is a liquid crystal display panel. Since the touch driving circuit SRIC can be applied to an organic light emitting display panel, etc., the present invention is not limited thereto.

In the touch sensing display device according to the present invention configured as described above, a method of setting (storing) the charge remover capacitance (CRC) compensation value, the charge remover voltage (CRV) compensation value, and the gain compensation values according to the average data value in the lookup table will be described as follows.

First, a touch detection output voltage $\Delta V_{out\_NON\_TOUCH}$ of the touch driving circuit SRIC when no touch is generated on the touch electrode TE is expressed by [Equation 1].

$$\Delta V_{OUT\_NON\_TOUCH} = \Delta V_{LFD} \qquad \text{[Equation 1]}$$

Here, $\Delta V_{LFD}$ is a reference voltage supplied to the second input terminal of the OP amplifier OP of the touch driving circuit SRIC.

In addition, when a finger touches the touch electrode TE, a touch detection output voltage condition of the touch driving circuit SRIC is as illustrated in [Equation 2].

$$C_{Finger}\Delta V_{LFD} = C_{FB}(\Delta V_{OUT\_TOUCH} - \Delta V_{LFD}) + (V_{CR} - \Delta V_{LFD})C_{CR} \qquad \text{[Equation 2]}$$

Here, $C_{Finger}$ denotes a capacitance when a finger is in contact with the touch electrode, $\Delta V_{out\_TOUCH}$ denotes an output voltage of the touch driving circuit SRIC when the finger is touched, $C_{CR}$ denotes a capacitance value of the charge remover capacitor $C_{CR}$ of the touch driving circuit SRIC, $C_{FB}$ denotes a capacitance value of the feedback capacitor $C_{FB}$ of the touch driving circuit SRIC, and $V_{CR}$ denotes the charge remover voltage $V_{CR}$ supplied from the power controller 160 to the touch driving circuit SRIC.

[Equation 2] is arranged to [Equation 3] in terms of the output voltage $\Delta V_{Vout\_TOUCH}$ of the touch driving circuit SRIC at the time of finger touching.

$$\Delta V_{OUT\_TOUCH} = \Delta V_{LFD} + \frac{C_{Finger}}{C_{FB}}\Delta V_{LFD} - \frac{C_{CR}}{C_{FB}}V_{CR} \qquad \text{[Equation 3]}$$

As can be seen from [Equation 3], the output voltage $\Delta V_{Vout\_TOUCH}$ of the touch driving circuit SRIC is inversely proportional to the capacitance value of the charge remover capacitor $C_{CR}$ of the touch driving circuit SRIC, the capacitance value of the feedback capacitor $C_{FB}$ of the touch driving circuit SRIC, and the charge remover voltage $V_{CR}$ supplied to the touch driving circuit SRIC from the power controller 160.

Accordingly, in the lookup table of the touch controller 150, the charge remover capacitance (CRC) compensation value, the charge remover voltage (CRV) compensation value, and the gain compensation values are set to be relatively low when the average data value is a low grayscale, and the charge remover capacitance (CRC) compensation value, the charge remover voltage (CRV) compensation value, and the gain compensation values are set to be relatively high when the average data value is a high grayscale.

A method of driving the touch sensing display device according to one or more embodiments of the present invention configured as described above will be described as follows.

First, the touch controller 150 stores the charge remover capacitance (CRC) compensation value, the charge remover voltage (CRV) compensation value, and the gain compensation value according to the input average data value in the lookup table.

The charge remover capacitance (CRC) compensation value, the charge remover voltage (CRV) compensation value, and the gain compensation values are set to be relatively low when the average data value is a low grayscale, and are set to be relatively high when the average data value is a high grayscale.

The timing controller 140 is supplied with the image data Vdata and the timing signals such as the vertical synchronization signal Vsync, the horizontal synchronization signal Hsync, the data enable signal DE, and the main clock MCLK from the host system (not illustrated).

The timing controller 140 generates the touch synchronization signal Tsync time-divided into 16 display driving periods DP1 to DP16 and 16 touch driving periods TP1 to TP16 during one frame, in which the display driving period DP and the touch driving period TP alternate.

The timing controller 140 generates average data values of data supplied to the data driving circuit 120 in each of the display driving periods DP1 to DP16 before each of the touch driving periods TP1 to TP16.

In addition, the timing controller 140 supplies the generated touch synchronization signal Tsync, the generated average data value, and the vertical synchronization signal Vsync to the touch controller 150.

The touch controller 150 receives the average data value in synchronization with the touch synchronization signal Tsync from the timing controller 140.

The touch controller 150 reads the charge remover capacitance (CRC) compensation value, the charge remover voltage (CRV) compensation value, and the gain compensation value according to the average data value received from the lookup table.

Then, the touch controller 150 outputs the read charge remover voltage (CRV) compensation value to the power controller 160.

The power controller 160 supplies the charge remover voltage $V_{CR}$ corresponding to the CRV compensation value to the touch driving circuit SRIC 130.

The touch controller 150 supplies the read charge remover capacitance (CRC) compensation value and gain compensation values to the touch driving circuit SRIC 130.

The touch driving circuit SRIC 130 receives the charge remover voltage $V_{CR}$.

The touch driving circuit SRIC 130 receives the charge remover capacitance (CRC) compensation value, and varies the capacitance of the variable charge remover capacitor $C_{CR}$ according to the received charge remover capacitance (CRC) compensation value.

The touch driving circuit SRIC 130 receives the gain compensation value, and varies the capacitance of the variable feedback capacitor $C_{FB}$ according to the received gain compensation value.

In addition, the touch driving circuit SRIC 130 amplifies a touch signal from the touch electrode TE and outputs a touch sensing value, according to the charge remover voltage $V_{CR}$, the varied capacitance of the charge remover capacitor $C_{CR}$, and the varied capacitance of the feedback capacitor $C_{FB}$ ($\Delta$Vout).

Figure 8:
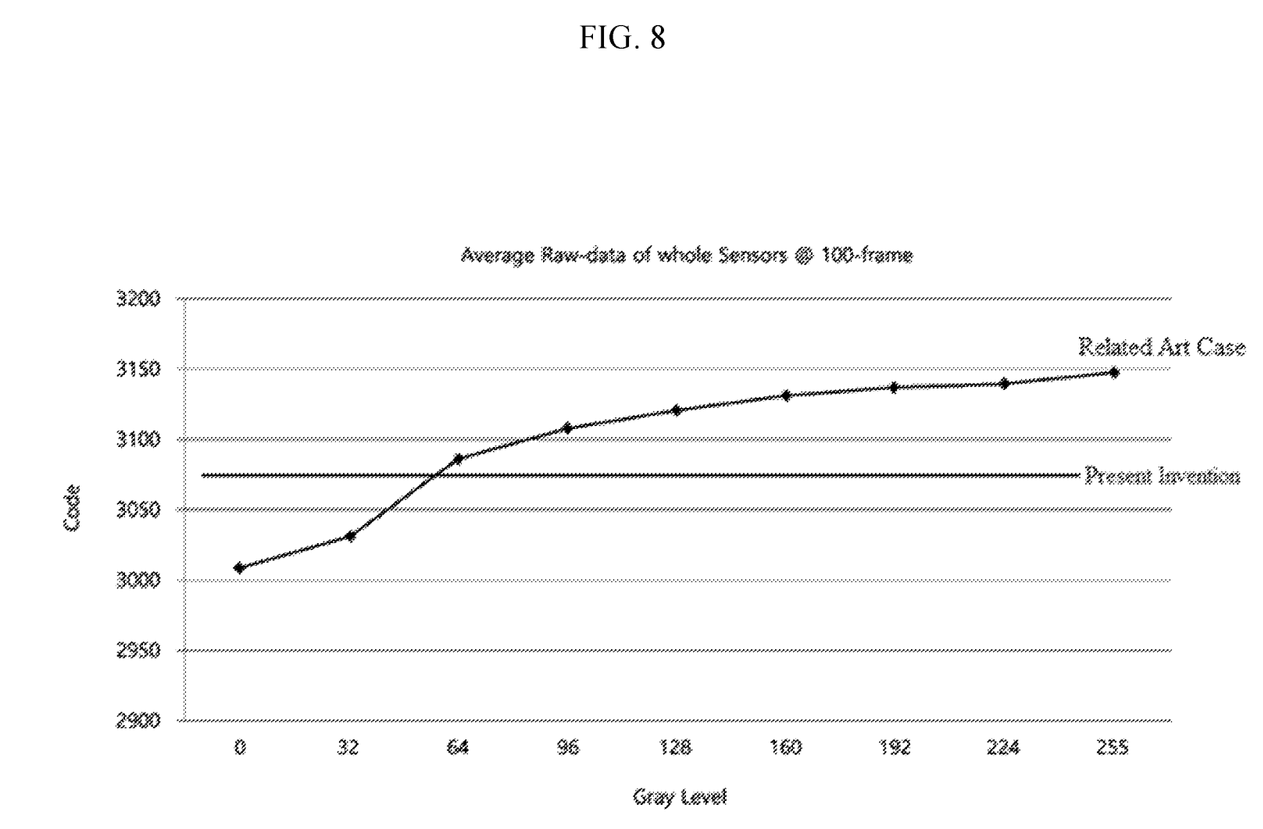
FIG. 8 is a graph illustrating an output voltage of the touch driving circuit SRIC versus a gray level.

FIG. 8 is a graph illustrating an output voltage of the touch driving circuit SRIC versus a gray level.

The X-axis indicates a gray level of average data input from the timing controller 140 to the touch controller 150, and the Y-axis indicates a code value obtained by converting an analog output voltage of the touch driving circuit SRIC into a digital value.

In FIG. 8, the case where the present invention is applied was compared with the case where the present invention is not applied (a related art case).

For example, in the related art to which the present invention is not applied (the related art case), the touch output voltage of the touch driving circuit SRIC is relatively low when low-grayscale image data is displayed and is relatively high when high-grayscale image data is displayed.

However, when the present invention is applied, the touch output voltage of the touch driving circuit SRIC is maintained constant when low-grayscale image data is displayed or when high-grayscale image data is displayed.

Accordingly, it is possible to improve the touch noise characteristics during moving image driving according to the embodiments of the present invention.

The touch display device and the driving method thereof according to the embodiments of the present invention having the above characteristics have the following effects.

The embodiments of the present invention varies the charge remover capacitor, the capacitance of the charge remover capacitor, and the capacitor of the feedback capacitor according to the average value of the data supplied to the data lines in each display driving period before each touch driving period and amplifies and outputs the touch sensing signal from each touch electrode.

Accordingly, during moving image driving, when low-grayscale image data is displayed or when high-grayscale image data is displayed, a touch sensing output voltage can be kept constant.

In addition, according to the embodiments of the present invention, since the touch sensing output voltage is kept constant during moving image driving as described above, touch noise is reduced during moving image driving, and when a window needs to be moved while the moving image is driven in a small window, the window can be smoothly moved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch sensing display device comprising:
   a display panel including a plurality of touch electrodes and a plurality of subpixels defined by a plurality of data lines and a plurality of gate lines;
   a timing controller configured to output an average data value and a touch synchronization signal in which a plurality of display driving periods and a plurality of touch driving periods are alternately time-divided;
   a touch controller configured to receive the average data value from the timing controller and output a charge remover capacitance compensation value, a charge remover voltage compensation value, and a gain compensation value based on the average data value;
   a power controller configured to receive the charge remover voltage from the touch controller and output a charge remover voltage based on the charge remover voltage compensation value; and
   a touch driving circuit configured to receive the charge remover capacitance compensation value and the gain compensation value from the touch controller, receive the charge remover voltage from the power controller, sense a touch signal from each touch electrode and output a touch sensing value based on the charge remover voltage, the charge remover capacitance compensation value and the gain compensation value,
   wherein at least one of the charge remover capacitance compensation value, the charge remover voltage compensation value, and the gain compensation value is used to adjust a variable capacitor for compensating the touch signal, and
   wherein the charge remover capacitance compensation value, the charge remover voltage compensation value and the gain compensation value are set to be low when the average data value is a low grayscale, and are set to be high when the average data value is a high grayscale.

2. The touch sensing display device according to claim 1, wherein the average data value is an average value of data supplied to data lines during each display driving period before each touch driving period.

3. The touch sensing display device according to claim 1, wherein the touch driving circuit includes:
   an amplifier configured to receive the touch signal from each touch electrode through a first input terminal and a reference voltage through a second input terminal, amplify the touch signal, and output the touch sensing value;
   a charge remover capacitor connected between an input terminal for receiving the charge remover voltage and the first input terminal of the OP amplifier; and
   a feedback capacitor connected between the first input terminal and an output terminal of the OP amplifier to adjust amplification gain of the OP amplifier.

4. The touch sensing display device according to claim 3, wherein:
   the charge remover capacitor is a variable capacitor whose capacitance varies according to the charge remover capacitance compensation value; and
   the feedback capacitor is a variable capacitor whose capacitance varies according to the gain compensation value.

5. The touch sensing display device according to claim 1, wherein the touch controller is configured to store the charge remover capacitance compensation values, the charge remover voltage compensation values, and the gain compensation values according to the average data values in a lookup table.

6. A driving method of a touch sensing display device, the driving method comprising:
    storing charge remover capacitance compensation values, charge remover voltage compensation values, and gain compensation values according to average data values in a lookup table;
    outputting a touch synchronization signal and an average data value in which a plurality of display driving periods and a plurality of touch driving periods are alternately time-divided;
    outputting a charge remover capacitance compensation value, a charge remover voltage compensation value, and a gain compensation value according to the average data value;
    outputting a charge remover voltage according to the charge remover voltage compensation value; and
    varying a capacitance of a charge remover capacitor according to the charge remover capacitance compensation value;
    varying a capacitance of a feedback capacitor according to the gain compensation value;
    amplifying a touch signal from each touch electrode according to the charge remover voltage, the varied capacitance of the charge remover capacitor and the varied capacitance of the feedback capacitor; and
    outputting a touch sensing value,
    wherein the charge remover capacitance compensation value, the charge remover voltage compensation value and the gain compensation value are set to be low when the average data value is a low grayscale, and are set to be high when the average data value is a high grayscale.

7. The driving method according to claim 6, wherein the average data value is an average value of data supplied to data lines during each display driving period before each touch driving period.

8. The driving method according to claim 6, wherein the touch sensing display device includes an amplifier configured to receive the touch signal from each touch electrode through a first input terminal and a reference voltage through a second input terminal, amplify the touch signal, and output the touch sensing value;
    wherein the charge remover capacitor is connected between an input terminal for receiving the charge remover voltage and the first input terminal of the OP amplifier; and
    wherein the feedback capacitor is connected between the first input terminal and an output terminal of the OP amplifier.

9. A touch sensing display device comprising:
    a display panel including a plurality of touch electrodes and a plurality of subpixels defined by a plurality of data lines and a plurality of gate lines;
    a timing controller configured to output an average data value and a touch synchronization signal in which a plurality of display driving periods and a plurality of touch driving periods are alternately time-divided;
    a touch controller configured to receive the average data value from the timing controller, and output a gain compensation value based on the average data value; and
    a touch driving circuit configured to receive the gain compensation value from the touch controller, sense a touch signal from each touch electrode and output a touch sensing value based on the gain compensation value,
    wherein the touch driving circuit includes:
        an amplifier configured to receive the touch signal from each touch electrode through a first input terminal and a reference voltage through a second input terminal, amplify the touch signal, and output the touch sensing value; and
        a feedback capacitor connected between the first input terminal and an output terminal of the OP amplifier to adjust amplification gain of the OP amplifier,
    wherein the feedback capacitor is a variable capacitor whose capacitance varies according to the gain compensation value, and
    wherein the gain compensation value is set to be low when the average data value is a low grayscale, and is set to be high when the average data value is a high grayscale.

10. A touch sensing display device comprising:
    a display panel including a plurality of touch electrodes and a plurality of subpixels defined by a plurality of data lines and a plurality of gate lines;
    a timing controller configured to output an average data value and a touch synchronization signal in which a plurality of display driving periods and a plurality of touch driving periods are alternately time-divided;
    a touch controller configured to receive the average data value from the timing controller, and output a charge remover capacitance compensation value based on the average data value; and
    a touch driving circuit configured to receive the charge remover capacitance compensation value from the touch controller, sense a touch signal from each touch electrode and output a touch sensing value based on the charge remover capacitance compensation value,
    wherein the touch driving circuit includes:
        an amplifier configured to receive the touch signal from each touch electrode through a first input terminal and a reference voltage through a second input terminal, amplify the touch signal, and output the touch sensing value;
        a charge remover capacitor connected between an input terminal for receiving a charge remover voltage and the first input terminal of the OP amplifier; and
        a feedback capacitor connected between the first input terminal and an output terminal of the OP amplifier to adjust amplification gain of the OP amplifier,
    wherein the charge remover capacitor is a variable capacitor whose capacitance varies according to the charge remover capacitance compensation value, and
    wherein the charge remover capacitance compensation value is set to be low when the average data value is a low grayscale, and is set to be high when the average data value is a high grayscale.

11. A touch sensing display device comprising:
    a display panel including a plurality of touch electrodes and a plurality of subpixels defined by a plurality of data lines and a plurality of gate lines;
    a timing controller configured to output an average data value and a touch synchronization signal in which a plurality of display driving periods and a plurality of touch driving periods are alternately time-divided;
    a touch controller configured to receive the average data value from the timing controller, and output a charge remover voltage compensation value based on the average data value;
    a power controller configured to receive the charge remover voltage compensation value from the touch controller, and output a charge remover voltage based on the charge remover voltage compensation value; and a touch driving circuit configured to receive the charge remover voltage from the power controller, sense a touch signal from each touch electrode and output a touch sensing value based on the charge remover voltage, wherein the touch driving circuit includes:
an amplifier configured to receive the touch signal from each touch electrode through a first input terminal and a reference voltage through a second input terminal, amplify the touch signal, and output the touch sensing value;
a charge remover capacitor connected between an input terminal for receiving the charge remover voltage and the first input terminal of the OP amplifier; and
a feedback capacitor connected between the first input terminal and an output terminal of the OP amplifier to adjust amplification gain of the OP amplifier, wherein the charge remover capacitor is a variable capacitor and the charge remover voltage compensation value is used to adjust the charge remover capacitor for compensating the touch signal, and wherein the charge remover voltage compensation value is set to be low when the average data value is a low grayscale, and is set to be high when the average data value is a high grayscale.

* * * * *